Nov. 6, 1945.  L. W. YOUNG  2,388,376
TEMPLET-FOLLOWING MACHINE
Filed June 3, 1943  5 Sheets-Sheet 1

INVENTOR
LLOYD W. YOUNG
BY
Ed Greenewald
ATTORNEY

INVENTOR
LLOYD W. YOUNG
BY
ATTORNEY

Nov. 6, 1945.　　　　　L. W. YOUNG　　　　2,388,376
TEMPLET-FOLLOWING MACHINE
Filed June 3, 1943　　　5 Sheets-Sheet 4

INVENTOR
LLOYD W. YOUNG
BY
ATTORNEY

Patented Nov. 6, 1945

2,388,376

UNITED STATES PATENT OFFICE 2,388,376

TEMPLET-FOLLOWING MACHINE

Lloyd W. Young, Elizabeth, N. J., assignor to Union Carbide and Carbon Corporation, a corporation of New York Application June 3, 1943, Serial No. 489,471

16 Claims. (Cl. 33—27)

This invention relates to templet-following machines, and has for its main object to provide a portable machine of this character in which the entire machine is adapted to ride upon a templet within the contour thereof, and to carry a cutting or welding tool overhanging the templet for reproducing the templet outline on a workpiece therebelow.

Heretofore universal shape-cutting machines have been in general of either the double carriage type or the pantograph type. In both of these types the cutting machine proper is positioned to one side of the work, with the result that overall the floor space required for the operation of the machine is more than double the floor space required for the work. The scope or transverse travel of either of these types is definitely limited to the size of the machine. By contrast with the machine according to the present invention, the scope of cutting is limited only by the size of the templet, and the floor space required for the cutting operation need be no larger than the size of the plate being cut.

Conventional cutting machines are not usually set up so that more than one machine can cut on a single plate. There have been a few cases however, where two upper carriages operating on a common bed were used for cutting one piece of work. In the present cutting machine several machine units may be employed, all operating simultaneously on one plate, thereby effecting a considerable saving in time.

Furthermore the cost of the present shape-cutting machine is only a small part of any conventional shape-cutting machine. The present portable shape-cutting machine does not require a tracing table, pantograph linkage or double carriage of any kind, hence greater accuracy and smoother cuts will be had because of the absence of vibration which ordinarily exists in overhanging arms.

Other objects are: to provide a self-propelled portable machine which can follow reentrant contours without rolling off the templet; to provide a magnetic templet follower for propelling the entire machine; to provide magnetic hold-down means; to provide drag means for retaining the machine in position when the magnetic hold-down means is not operative; and to otherwise simplify, improve, and reduce the cost of construction and operation of machines of this character.

How the foregoing objects and advantages are attained, together with others which will occur to those skilled in the art will be apparent from the accompanying drawings, in which.

Figure 1:
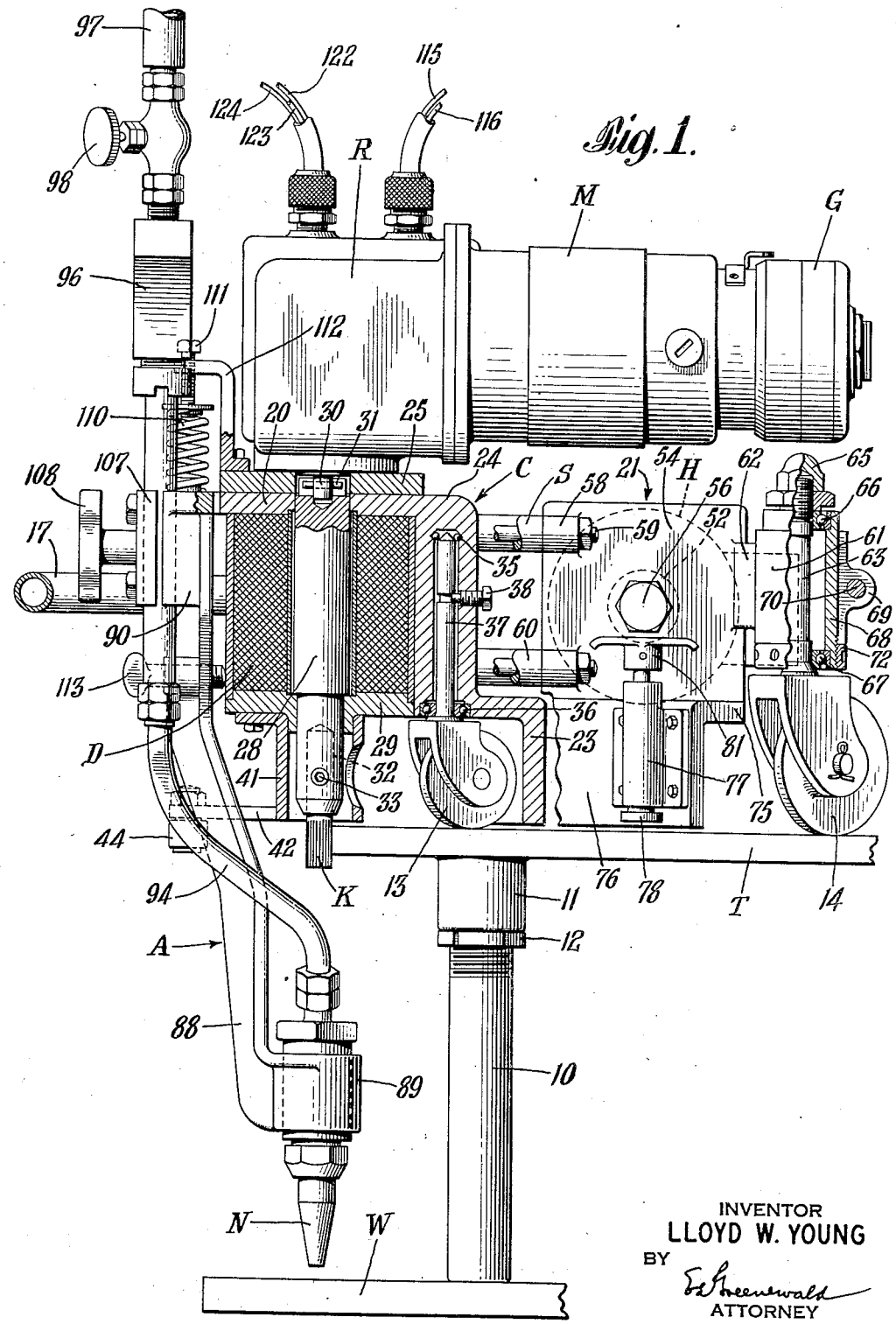
Fig. 1 is a side elevational view of the machine according to the preferred embodiment of the present invention, in position riding upon a templet, the machine having certain parts broken away and shown in vertical section.

As shown in Fig. 1, the templet T is supported directly over the work W by a plurality of adjustable legs 10 which are threaded into a coupling member 11 on the underside of the templet. Rotation of the supporting legs 10 permits adjusting and leveling the templet with respect to the work, and lock nuts 12 prevent rotation of the legs once the correct setting has been made.

The templet-riding machine comprises a carriage C supported on casters 13, 14, and 15, so that it can freely roll about all marginal portions of the templet T in any direction, but subject to control as hereinafter described. Arms 16 extending laterally from the carriage, support a handrail 17 for manually steering the carriage. Pivotally mounted on the carriage C is an adaptor A which supports a cutting nozzle N.

In the form shown, the carriage is composite, being made up of magnetically separate parts. A frame member 20 carries a magnet coil D for energizing a trunnion K which is knurled for traction purposes in engagement with the edge of the templet T. A rear frame member 21 carries a hold-down magnet H, for retaining the carriage on the templet and from preventing the same from tipping over. The frame members are connected by spacers S, which are of non-magnetic material to prevent magnetic short circuit of the respective fields.

Figure 3:
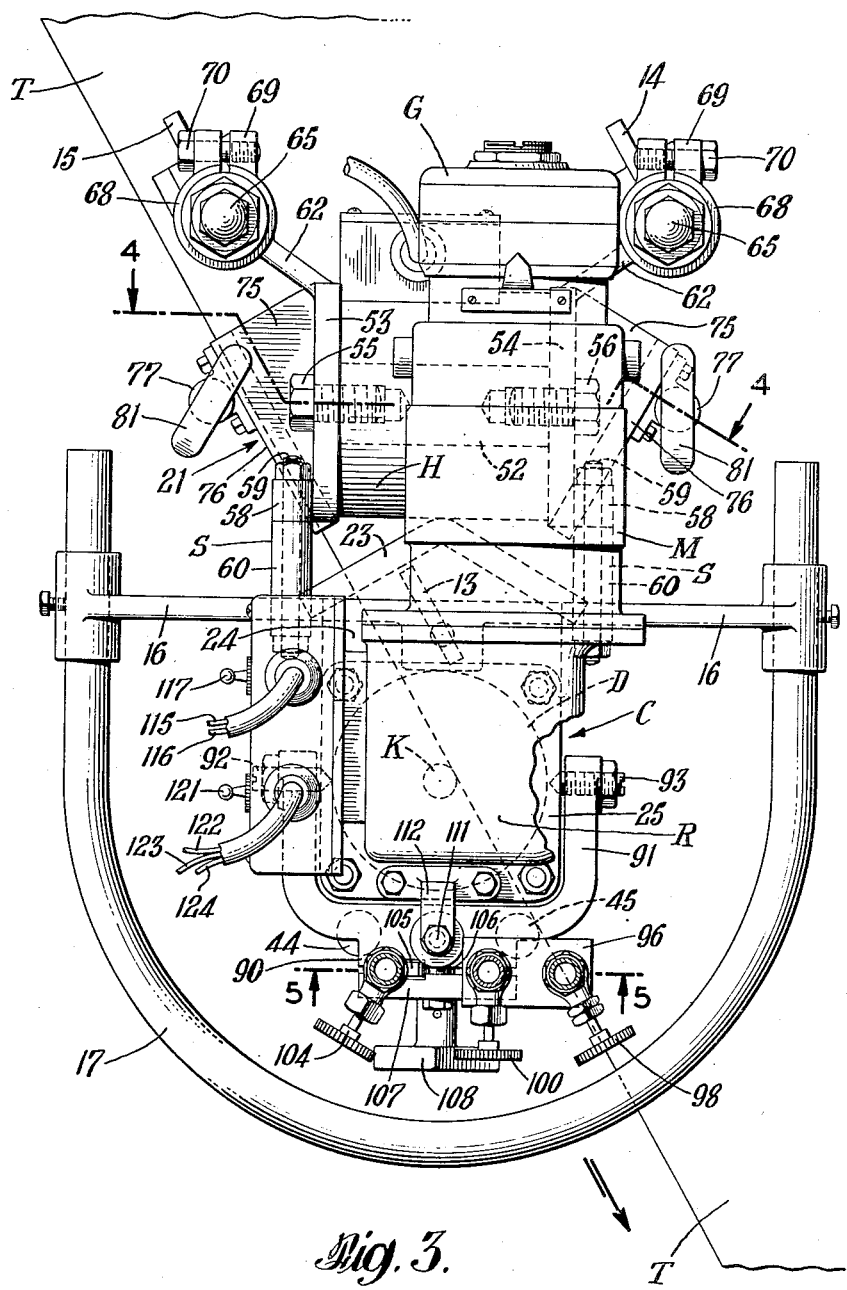
Fig. 3 is a plan view of the cutting machine shown in Figs. 1 and 2.

The front frame member 20 is generally Z-shaped and formed of magnetic material such as iron or steel. The lower end 23 of this frame member is in the form of a V as shown in Fig. 3, and the upper end 24 of the frame member 20 has secured thereto a motor mounting plate 25. The arms 16 for supporting the hand rail 17 are carried by this frame member 20, being preferably integral therewith. The Z-shaped frame member 20 forms a path for the magnetic flux of the drive magnet coil D.

A motor-drive unit is mounted on the plate 25 and suitably secured in position by four screws not shown, so that the unit is readily removable for overhaul or replacement. This unit comprises a motor M of the fractional horse power series universal type, a speed reducer R of the gear type and a speed control governor G for controlling the speed of the machine.

Journaled in the upper end 24 of the frame member 20 is a spindle 28, the lower end of which is journaled in a coil enclosure 29 of non-magnetic material such as brass, and suitably secured to the frame member 20. The spindle 28 is provided with a recess to receive the power take-off shaft 30 of the motor gear reducer R. Slots are machined either side of the recesses to receive a cross pin 31 in the shaft 30, thereby expediting the removal of the motor-drive unit.

The lower end of the spindle 28 carries the knurled trunnion K, which engages the templet T and progresses the machine therealong. In the form shown the trunnion K is carried by a removable stem 32, secured in a central bore in the bottom of the spindle 28 by a screw 33. The magnetic flux for the coil D is through the frame member 20, the templet T, drive trunnion K, and spindle 28, all of which must be of magnetic material, such as the ferrous metals, iron and steel.

The frame member 20 is provided with anti-friction bearings 35 and 36, which insure free rotation of the stem 37 of the front caster 13 which serves as a central support for the machine. The stem 37 is provided with an annular recess receiving a set screw 38, to retain the stem 37 in position while permitting free rotation thereof. The hub of caster 13 is provided with suitable anti-friction bearings not shown.

Secured to the underside of the coil enclosure 29 is a tubular member or sleeve 41 of non-ferrous metal such as brass, which is cut away on the rearward side to clear the path of rotation of the caster 13 about its stem. The bottom of the sleeve 41 has a close clearance with the templet, so as to prevent the machine from tipping over. The lower end of the tubular member 41 carries two forwardly extending arms 42 and 43, on the outer ends of which are journaled respectively depending guide rolls 44 and 45 for engaging the edge of the templet and retaining the carriage thereon.

The rear frame member 21 comprises a pair of end plates 53 and 54, which are secured by screws 55 and 56 to the ends of a core 52 for the hold-down magnet H. Lugs 58 on these end plates receive brass stud bolts 59 extending from the front frame member 20 and passing through brass tubes 60 which form the spacers S. The magnetic flux for the hold-down magnet H is through core 52, end plates 53 and 54, and templet T.

The rear casters 14 and 15 are swivelled in bosses 61 on the ends of struts 62 projecting from the end plates. These rear casters are magnetically separated or divorced from the end plates by constructing the struts 62 of non-magnetic material such as brass, so as not to short circuit the hold-down coil H magnetically.

These casters are adjustable vertically for the purpose of leveling the machine. Each of the rear casters 14 and 15 has a stem 63 secured by a nut 65 in anti-friction bearings 66 and 67 carried by a sleeve 68 slidable in the boss 61. The boss 61 has split lugs 69 and a locking screw 70 for clamping the sleeve 68 therein. The boss rests upon an adjustment nut 72 threaded on the bottom of the sleeve 68.

Figure 4:
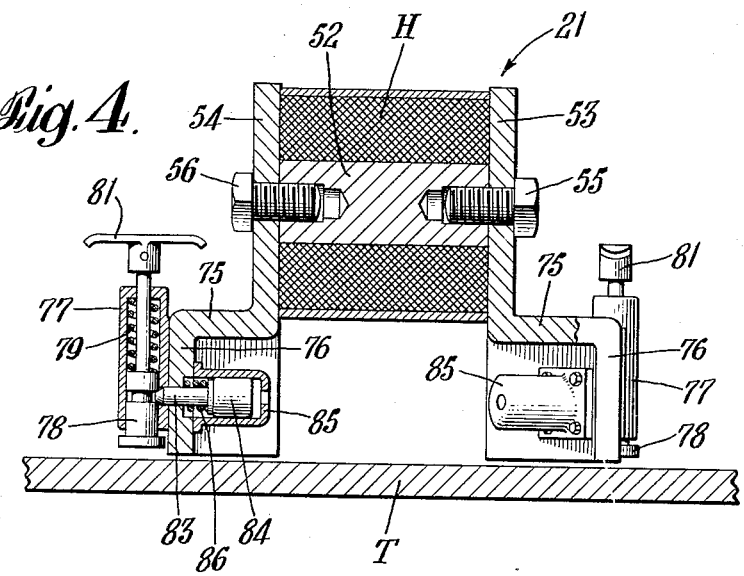
Fig. 4 is a sectional view of the hold-down coil assembly taken on the line 4—4 of Fig. 3.

As shown in Fig. 4, the end plates 53 and 54 each have a lateral flange 75, and a depending vertical flange 76. Mounted on each flange 76 is a vertical cylinder 77 in which is mounted a drag button 78, and a spring 79 urging the same downwardly. The drag button has a stem extending upward through the spring and cylinder to a lifting handle 81.

The drag button 78 has an annular recess adapted to receive the conical end of a latching pin 83 which slides through the flange 76 and is pressed toward the drag button by a steel piston 84, which slides within a cylinder 85 of non-magnetic material suitably secured to the flange 76. The plunger 84 is attracted to the end plate flange 76 when the coil H is energized. A spring 86 mounted in the cylinder and around the pin 83 opposes the action of the plunger.

Figure 2:
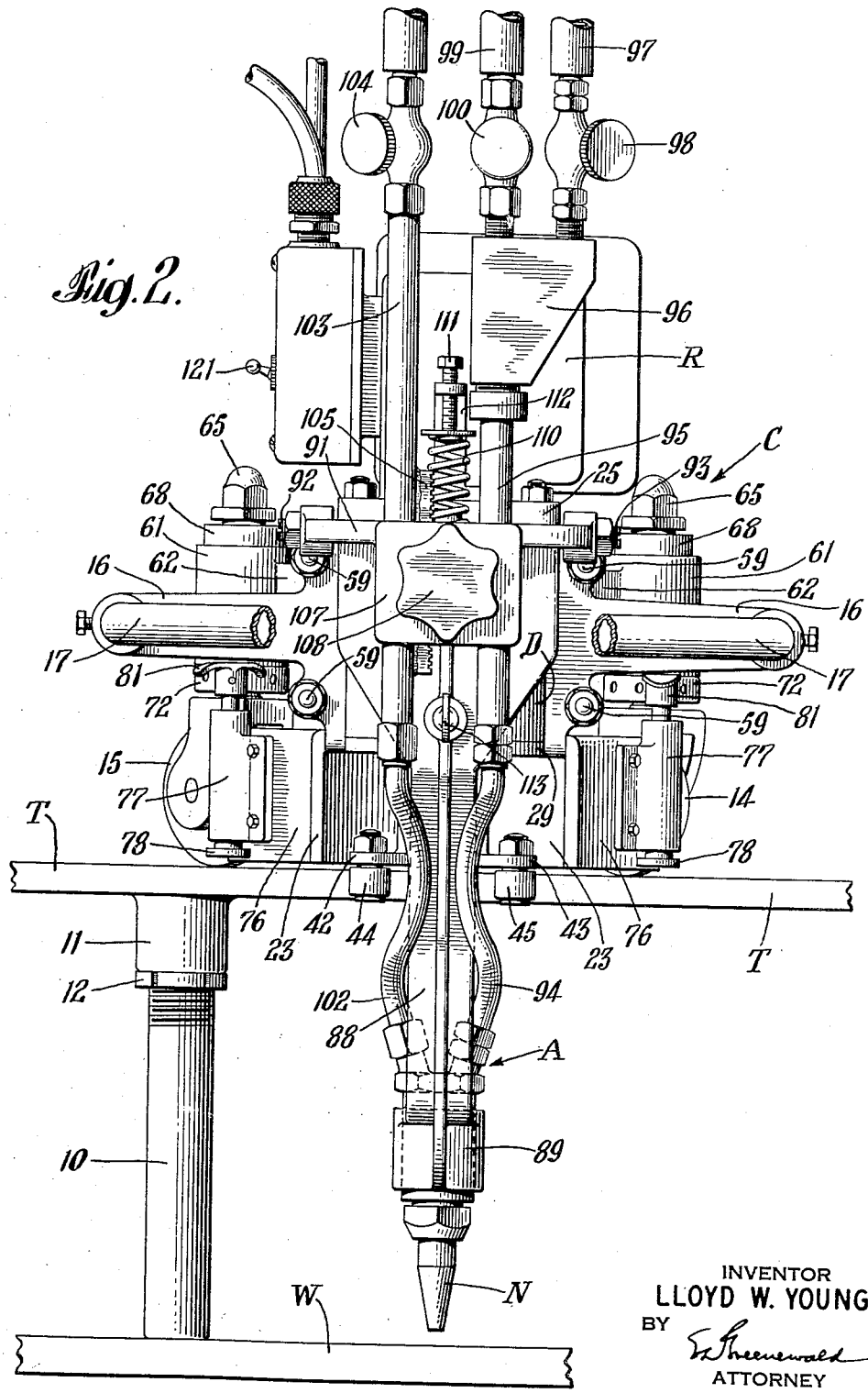
Fig. 2 is a front elevational view of the machine shown in Fig. 1.

As shown in Figs. 1 and 2 the adaptor A on carriage C comprises an adaptor arm 88 which supports the cutting nozzle N by means of a terminal boss 89, in which the nozzle N is vertically slidably mounted. The adaptor arm 88 is fixed to a supporting bracket 90, preferably integral therewith as shown. As shown in Figs. 2 and 3, this bracket has an upper yoke portion 91 which is pivoted to the carriage C upon screws 92 and 93.

A preheating gas tube 94 connects the nozzle N with a tube 95, leading from a mixer 96 which receives acetylene from a conduit 97 controlled by valve 98. The mixer 96 receives preheating oxygen from a conduit 99 controlled by a valve 100. A lower cutting oxygen tube 102 connects the nozzle N with an upper oxygen tube 103 controlled by a valve 104.

Figure 5:
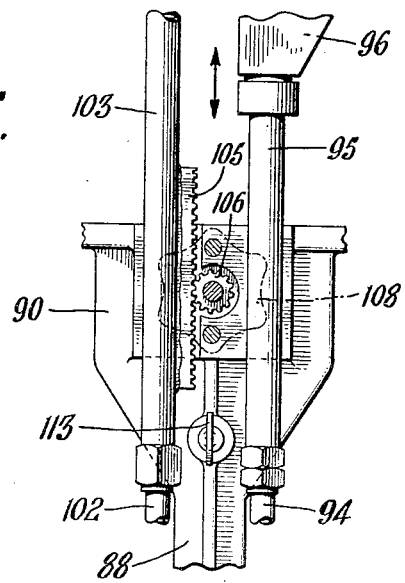
Fig. 5 is a section taken along the line 5—5 of Fig. 3.

As shown in Fig. 5, rack 105 is attached to the upper cutting oxygen tube 103 and meshes with a pinion 106 which rotates within a clamping plate 107 and is turned by a hand-adjustment wheel 108. Thus, by rotating hand wheel 108 a unit may be raised or lowered, the unit comprising the mixer 96, mixer tube 95, preheat tube 94, cutting oxygen tubes 102 and 103, and cutting nozzle N.

The supporting bracket 90 is urged downward by a spring 110, the pressure of which is adjustable by means of a screw 111 threaded in a bracket 112 secured to the motor mounting plate 25. The adaptor assembly is adjusted about its pivots 92 and 93 by a thumb screw 113 threaded in the adaptor arm 88.

Figure 7:
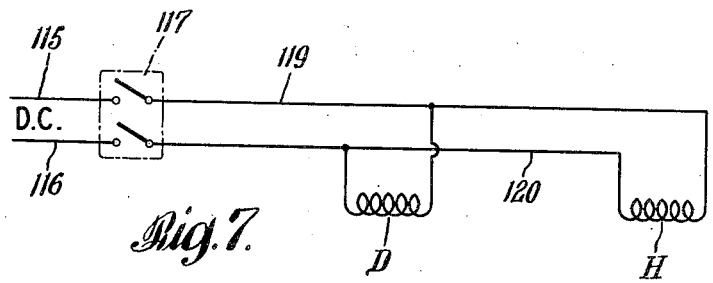
Fig. 7 is a wiring diagram of the circuit for the two direct current magnet coils; and, Fig. 8 is a wiring diagram of the circuit for the drive motor and reversing switch.

Referring to Fig. 7, the direct current line for energizing the two magnets, comprises the lines 115 and 116 which are connected to a switch 117 of the double pole single throw type which controls the current to coils D and H through connections 119 and 120.

Figure 8:
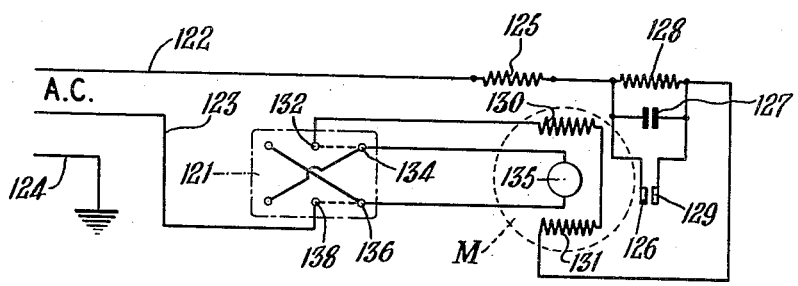

Referring to Fig. 8, a switch 121 of a double pole double throw type with a neutral position serves with an off-and-on switch as well as a reversing switch for the motor M. The lines 122 and 123 connect to a main line of alternating current supply. Line 122 is connected to line register 125, governor contact 126, condenser 127 and resistor 128, governor contact 129, motor field 130 and 131, and connection 132 of the double pole double throw switch 121.

Assuming switch 121 is thrown to the right, as shown by the dotted line between connection 132 and 134, the remainder of the circuit will be from connection 134 to motor armature 135, armature 135 to connection 136, connection 136 to connection 138, and to line 123. Third line 124 is a ground wire within the alternating current line cord to the machine proper, and is connected to the frame of the machine and grounded to the conduit at the plug receptacle.

In setting up the machine, the carriage C is placed on the templet T, with the trunnion K engaging the edge of the templet. The drag buttons 78 being urged downwardly by the springs 79, hold the carriage in position. The switch 117 of Fig. 7 is then closed, to supply direct current for energizing the coils of trunnion magnet D and hold-down magnet H. Each lifting handle 81 is now raised until the recess in the drag button 78 registers with the conical end of latching pin 83, whereupon the plunger 84 presses the conical end of the pin 83 into the recess, and holds the drag button in raised position.

Energization of the trunnion magnet D holds the trunnion K against the edge of templet T, and energization of the hold-down magnet H results in a strong attraction of the end plates 53 and 54 for the upper surface of templet T. Thus the two magnetic circuits cooperate to hold the carriage in position on the templet. The attraction of the magnet H is such that the end plates cannot be readily moved beyond the edge of the templet. Furthermore, this magnet H also prevents the machine from tipping over.

In order to center the cutting nozzle N directly under the drive trunnion K, so as to produce a normal or true line of cut, the bracket 91 may be moved to the left, looking at Figs. 2 and 3, by loosening the right pivot screw 93 and tightening the left pivot screw 92. Conversely, to move the bracket 91 to the right, the screw 92 is loosened and the screw 93 tightened. Adjustment of the cutting nozzle N with respect to the drive trunnion K in the other direction, being in the longitudinal plane of the carriage, is accomplished by turning the thumb screw 118 which pivots the arm 98 in this plane about the axis of the pivot screws 92 and 93.

In order to pierce the work, for starting the cut, at a point offset from the normal line of cut, the thumb screw may be rotated sufficiently to move the cutting nozzle approximately three-eighths of an inch inside or outside of the normal line of cut.

The switch 121 of Fig. 8 is now closed to start the motor M, which through the speed reducer R and its shaft 30, rotates the spindle 28 and its trunnion K. This rotation causes the trunnion K to progress along the edge of the templet T in rolling contact therewith. The pressure of the magnetic attraction between the trunnion and the templet, and knurled periphery of the trunnion, combine to produce tractive force adequate to prevent slippage, so that the tractive effort of the trunnion K pulls the carriage C along after it.

The hold-down magnet H offers little resistance to the tractive effort of the trunnion K. Furthermore, lateral movement of the end plates to another area of surface within the templet outline results in an equal path for the flux through the templet, so that there is little resistance to lateral movement. But when the carriage comes to the edge of the templet and tends to ride off the surface, that tends to reduce the area of templet surface in the flux path, with consequent increase resistance to lateral movement.

Figure 6:
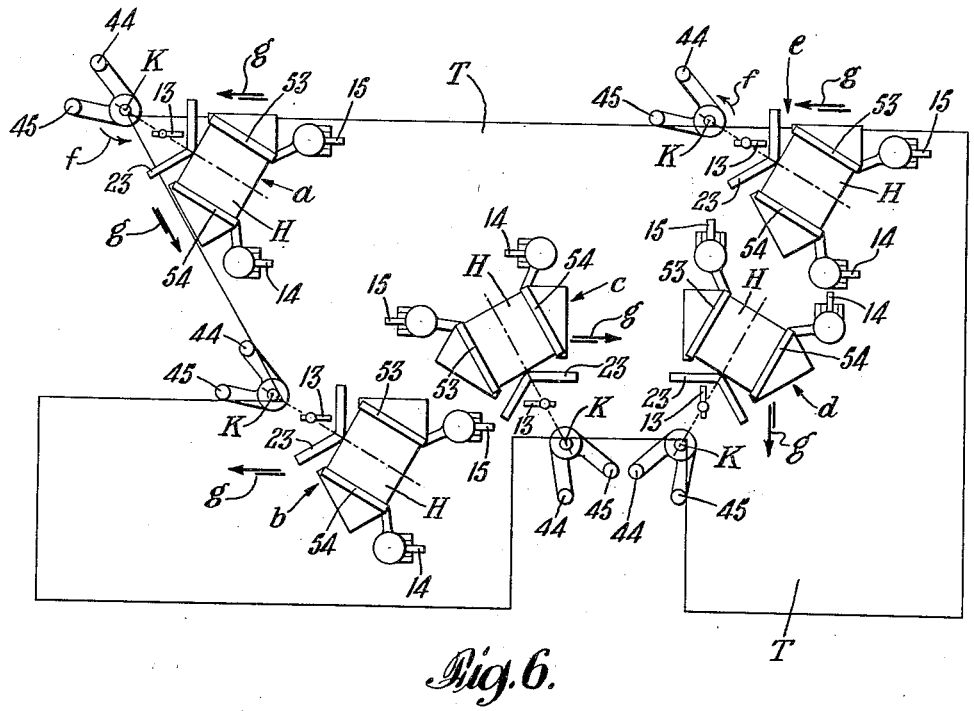
Fig. 6 is a schematic plan view of a templet showing the machine in five positions.

When the machine is in the position e of Fig. 6, and the trunnion K is rotating in the direction of the arcuate arrow f, the trunnion progresses along the templet in the direction of the straight arrow g. The roll 45 engaging the edge of the templet ahead of the trunnion K prevents the caster 15 from reaching the edge of the templet. Thus the guide roll 45 and the hold-down magnet H combine to prevent the carriage from rolling off the templet.

Rolls 44 and 45 are positioned with respect to the drive trunnion K so as to determine the minimum angle of inside corner into which the machine will operate. While greater or lesser angles may be employed, the preferred angle is 60° as shown in Figs. 6 at position b. When the machine approaches an inside corner as shown at position c, the roll 45 will contact the edge of the templet and swing the entire machine around as shown in position d. Thus it is readily apparent that the machine is equally adapted to follow a templet having an internal contour, as well as one having an external contour.

The freely rolling and swiveling nature of the casters 13, 14, and 15, and the lack of resistance of the hold-down magnet H to lateral movement within the templet outline, results in the machine moving freely over the templet surface, drawn along by the trunnion K about the roll 45 as a pivot. Also, the angle between the hold-down flanges 76 is preferably equal to the angle between the rolls 44 and 45. These features insure proper alignment of the rearward magnetic structure.

If for any reason the current to the coil of magnet H is interrupted, the magnetic attraction of the end plate 54 for the plunger 84 is released, and the spring 86 pulls the pin 83 out of the recess in the drag button 78, whereupon the spring 79 forces the drag button into contact with the upper surface of the templet, and prevents the machine from running off the templet and falling to the floor.

Obviously, other arrangements of structure could be employed for carrying out the principles of this invention. For example, a long, small diameter cutting nozzle running through a hollow drive trunnion would increase the scope of the machine.

I claim:

1. A templet reproducing machine comprising a carriage having casters adapted to ride on a templet, means on said carriage for following the contour of said templet, guide rolls on said carriage located at positions divergently outwardly from said following means, and means aligned with said contour following means for reproducing said contour.

2. A templet reproducing machine comprising a carriage having casters adapted to ride on a templet, means on said carriage for following the outline of said templet, guide rolls on said carriage located at positions divergently outwardly from said following means and selectively engaging the contour of said templet for preventing said carriage from riding off said templet, and means actuated by said contour following means for reproducing said contour.

3. A templet reproducing machine comprising a carriage having casters adapted to ride on a templet, a magnetized trunnion journaled on said carriage for following the contour of the templet, means on said carriage for driving said trunnion, guide rolls on said carriage located at positions divergently outwardly from said trunnion, and means actuated by said trunnion for reproducing said contour.

4. A templet reproducing machine comprising a carriage having casters riding on a templet, means on said carriage for following the contour of the templet, magnetic hold-down means for preventing tipping of said carriage on its casters, and means aligned with said contour following means for reproducing said contour.

5. A templet reproducing machine comprising a carriage having casters adapted to ride on a templet, means on said carriage for following the contour of the templet, magnetic hold-down means for preventing tipping of said carriage on its casters, means aligned with said contour following means for reproducing said contour, and friction drag means for holding said carriage in position when said magnetic hold-down means is inoperative.

6. A templet reproducing machine comprising a carriage having casters adapted to ride on a templet, means on said carriage for following the contour of the templet, an adaptor mounted on said carriage, means on said adaptor and aligned with said contour following means for reproducing said contour, and means for moving said adaptor relative to said carriage and radially away from said contour following means for positioning said contour reproducing means in offset relation with said contour following means.

7. In a templet reproducing machine, a carriage having a magnetized trunnion journaled thereon for engaging the edge of the templet, in combination with a hold-down magnet for attracting the surface of the templet.

8. A templet reproducing machine as claimed in claim 7, in which the carriage comprises non-magnetic material for separating the fields of the respective magnets.

9. In a templet reproducing machine, a carriage comprising a front frame member and rear frame member of magnetic material and non-magnetic spacing means therebetween, casters for supporting said carriage on a templet, said front frame member carrying a drive trunnion journaled thereon and means for magnetizing said trunnion, said rear frame member carrying means forming therewith a hold-down magnet for preventing said carriage from rolling off said templet, and an adaptor head carried by said carriage for supporting a nozzle in substantial alignment with said drive trunnion.

10. Apparatus for reproducing a contour, comprising a templet having the contour to be reproduced, means for supporting said templet directly over the work, a carriage having casters swivelled thereon for supporting said carriage on said templet, means on said carriage for following the contour of said templet, guide rolls on said carriage on the opposite side of said following means from said casters, and located at positions divergently outwardly from said following means, and means depending from said carriage and co-ordinated with said contour following means and operating upon said work for reproducing said contour.

11. Apparatus for reproducing a contour, comprising a templet having a contour to be reproduced, means for supporting said templet upon the work and spaced thereabove, a carriage having casters swivelled thereon in rolling contact with said templet for supporting said carriage thereabove, means on said carriage engaging said templet contour for following the same, means on said carriage for driving said contour following means, guide rolls on said carriage on the opposite side of said contour following means from said driving means, and located at positions divergently outwardly from said following means and means depending from said carriage in vertical alignment with said contour following means and operating upon said work for reproducing said contour.

12. A templet reproducing machine comprising a carriage, means for supporting said carriage for movement in all directions in a plane parallel to a templet, magnetic means on said carriage engaging a portion of the edge of said templet for following the contour thereof, means actuated by said contour following means for reproducing said contour, and non-magnetic means cooperating with said contour following means located at positions divergently outwardly from said magnetic means and adapted to engage another portion of the same edge of said templet for preventing said carriage from moving outside of the confines of said templet.

13. A templet reproducing machine comprising a carriage, means for supporting said carriage for movement in all directions in a plane parallel to a templet, means on said carriage for following the contour of the templet, magnetic hold-down means for preventing said contour following means from rising away from said templet, and means actuated by said contour following means for reproducing said contour.

14. A templet reproducing machine comprising a carriage, means for supporting said carriage for movement in all directions in a plane parallel to a templet, means on said carriage for following the contour of the templet, hold-down means on said carriage cooperating with the upper surface of said templet for maintaining said carriage in position with respect to said templet, and means actuated by said contour following means for reproducing said contour.

15. A templet reproducing machine comprising a carriage, means for supporting said carriage for movement in all directions in a plane parallel to a templet, means on said carriage for following the contour of the templet, an adaptor mounted on said carriage, means on said adaptor and actuated by said contour following means for reproducing said contour, and means for moving said adaptor relative to said carriage and radially away from said contour following means for positioning said contour reproducing means in offset relation with said contour following means.

16. In a templet reproducing machine, a carriage comprising a front frame member, a rear frame member of magnetic material, and non-magnetic spacing means between said members, said front frame member carrying a drive trunnion journaled thereon and means for magnetizing said trunnion, said rear frame member carrying a hold-down magnet.

LLOYD W. YOUNG.